J. W. NELSON AND R. S. COULTER.
CONNECTING ROD OILING MEANS.
APPLICATION FILED MAR. 13, 1920.

1,392,592.

Patented Oct. 4, 1921.
2 SHEETS—SHEET 1.

Witnesses
Milton Lenoir
J. W. Florell.

Inventors
Joseph W. Nelson
Robert S. Coulter,
Heidman Stret
Attorneys

J. W. NELSON AND R. S. COULTER.
CONNECTING ROD OILING MEANS.
APPLICATION FILED MAR. 13, 1920.
1,392,592. Patented Oct. 4, 1921.
2 SHEETS—SHEET 2.
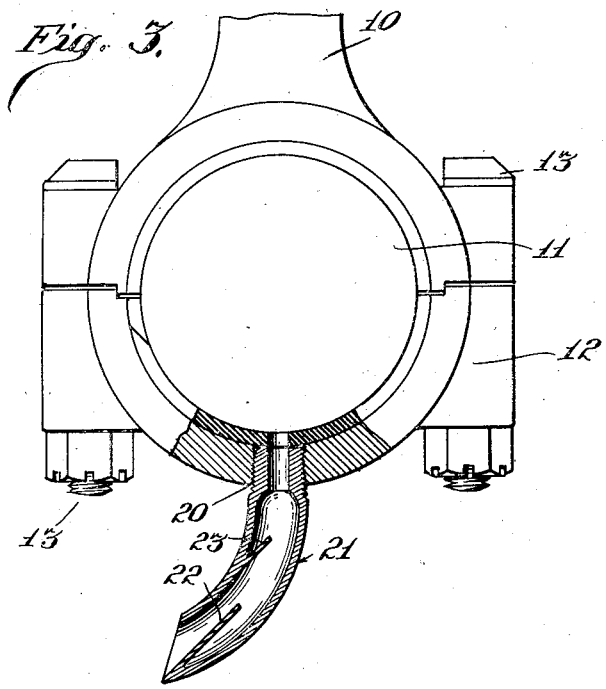
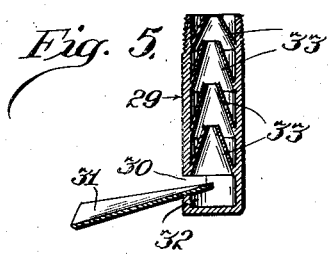
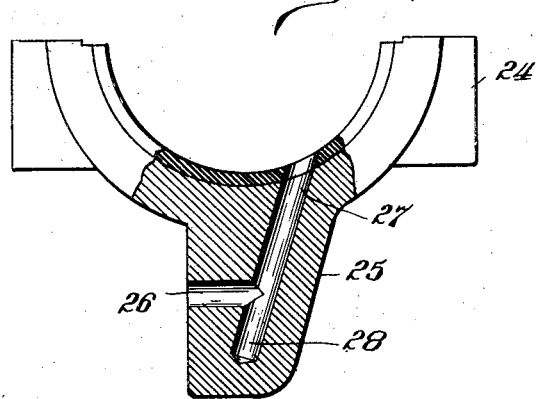
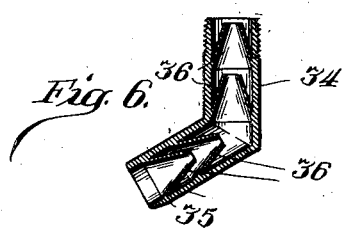
Witnesses
Wilton Lenoir
F. A. Morell.
Inventors
Joseph W. Nelson
Robert S. Coulter,
By Heidman & Street
Attorneys

UNITED STATES PATENT OFFICE.

JOSEPH W. NELSON AND ROBERT S. COULTER, OF ST. CLOUD, MINNESOTA.

CONNECTING-ROD-OILING MEANS.

1,392,592.         Specification of Letters Patent.         Patented Oct. 4, 1921.

Application filed March 13, 1920. Serial No. 365,378.

*To all whom it may concern:*

Be it known that we, JOSEPH W. NELSON and ROBERT S. COULTER, citizens of the United States, and residents of St. Cloud, in the county of Stearns and State of Minnesota, have invented certain new and useful Improvements in Connecting-Rod-Oiling Means, of which the following is a description, reference being had to the accompanying drawings, which form a part of our specification.

Our invention relates to means for oiling the bearings between the connecting or piston rods and the crank-pins of the crank-shaft of an internal combustion motor; the object of the invention being to provide means whereby oil will be taken from the dip-trough and delivered to the connecting rod bearings on the crank-pin or crank-shaft pin; the means insuring a constant lubrication of the connecting or piston-rod bearings at all motor speeds and more particularly at high motor speeds.

One object of our invention is to provide means whereby the oil will be dipped from the dip-trough of the motor during rotation of the crank-shaft and therefore also rotation of the piston or connecting rod; the means being of such construction that it will retain a greater portion of the oil dipped or taken up during the lower part of the stroke or orbit described by the crank-shaft end of the piston rod, namely during the passage of said means through the dip-trough of the oil pan beneath the crank-case and subsequently cause a delivery of the retained oil when the connecting rod reaches a point in its stroke where the centrifugal force will be in the opposite direction relative to the position of the crank-pin and therefore of said means, namely as the crank-pin and connecting-rod approach the top of the stroke or orbit and are positioned above the crank-shaft center and the force is in a direction toward the piston or connecting-rod bearings.

The objects and advantages of our invention will be readily comprehended from the detailed description of the accompanying drawings, wherein:—

Fig. 3 is an enlarged detail view of the crank-pin end of a piston or connecting rod shown partially in section and disclosing a modified form of our invention.

Fig. 4 is a detail view, partially in section, of a connecting rod head or cap and illustrating a modified form of our invention.

Fig. 5 is a detail sectional view of another modified form of our improved oiling means.

Fig. 6 is a similar view of a slightly different form from that shown in Fig. 5, employing substantially the same type of baffles or pockets.

Figure 1:
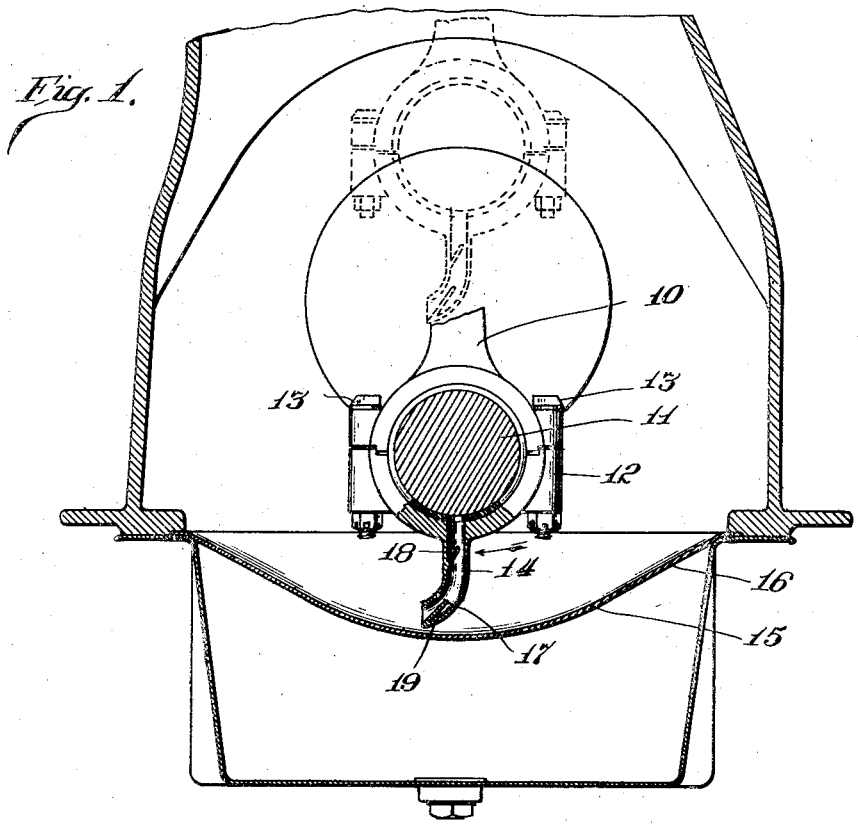
Figure 1 is a detail sectional view of a portion of the crank-shaft case and oil-pan of an internal combustion motor and illustrating that portion of a piston or connecting rod which is secured to the crank-pin of the crank-shaft, with a portion of the connecting rod head shown in section and provided with our improved oiling means.

In the specific exemplification of the invention as disclosed in Fig. 1, a portion of the piston or connecting rod of an internal combustion motor is shown at 10 secured to the crank-shaft pin 11 in the usual manner by means of the connecting rod cap 12 held in place by the usual bolts 13; the cap retaining the usual bearing metal in place.

Figure 2:
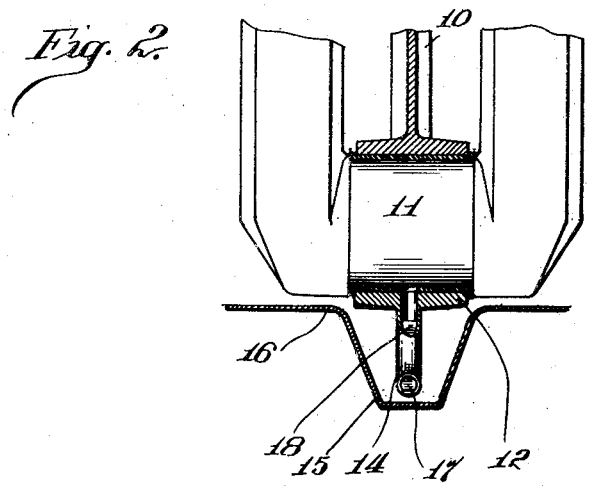
Fig. 2 is a side elevation of a portion of the crank arms of a crank-shaft with a portion of connecting rod shown in section and provided with our improved oiling means; the view being taken substantially at right angles to Fig. 1 within the crank-case.

In the construction as illustrated in Figs. 1 and 2, the cap 12 is provided with a depending tubular portion 14, formed integral with the cap or removable end connection 12 and extending from a central point.

The lower end of the tubular portion 14 is open and disposed or curved slightly forward, relative to the direction of rotation of the crank-shaft and therefore also of the connecting rod. The depending tubular portion 14 is intended to extend into the dip-trough 15 of the oil-pan 16 secured to the bottom of the crank-shaft case of the motor. The extension or portion 14 is provided with baffle members 17 and 18. The baffle member 17 extends inwardly from a point adjacent the orifice of the member where it is secured to the side wall of the member, for a short distance and is disposed transversely of the member to provide a pocket 19 rearward of the baffle 17. The baffle is so arranged as to leave a considerable portion of the passage through the member 14 unobstructed for the ingress of the oil taken up during the passage of the member through the trough. Baffle member 18 is preferably formed integral with the opposite wall of the member 14 and at a point farther inward, to-wit: intermediate of baffle member 17 and the inner end of the member 14. The connecting rod cap or connection 12 is, of course, also provided with a port or passage therethrough communicating with and constituting a continuation of the passage through the member 14, as clearly shown in the drawings, whereby communication with the connecting-rod bearings is established. The baffle member 18 is also disposed inwardly, that is in a direction toward the crank-shaft pin 11 so as to provide a pocket rearward thereof and in the particular exemplification arranged on the opposite side of the member 14 from that on which the pocket 19, formed by baffle member 17, is located; the baffle member 18, like baffle 17, being also formed to leave a passage through the member 14 so that oil may flow past what may be called the outer or unattached ends of both baffle members 17 and 18 and onto the connecting rod bearings.

With our improved construction, it is apparent that when the connecting rod is on its down stroke and in close proximity to the oil-pan, the dipper member 14 will pass through the dip-trough of the oil-pan and cause oil to flow into the open end of the dipper member 14. Due to the action of centrifugal force, the oil which has entered the member 14 will not flow entirely up through the dipper member 14, but will only pass upward part way into the member; so that unless some restraining means are provided within the dipper member, the scooped or dipped-up oil will be thrown out of the dipper element or member 14 in the continued operation of the crank-shaft, through the action of the centrifugal force, with the result that the oil will be prevented from finding its way to the connecting rod bearings. With the dipper member 14 provided with the pockets previously described and formed by the baffle members 17 and 18, it is evident that the oil, which has entered the orifice of the dipper member 14, will initially flow into the pocket 19 rearward of baffle member 17 during the continued stroke of the connecting-rod, where it will remain until the connecting rod approaches the upper part of its stroke where the centrifugal force is in the reverse direction, relative to the position of the crank-pin and the dipper, when the pocketed oil in pocket 19 will be caused to flow toward the inner and the upper end of the member 14; at which time that portion of the oil which has not reached the connecting rod bearings by the time the crank pin is positioned where the centrifugal force is toward the lower end of the member 14, will be prevented from flowing out of the lower open end of the member 14 during the down stroke or further rotation of the connecting rod, by the baffle 18. The baffle 18 will retain the pocketed oil until the connecting rod again and crank-pin also approaches the upper part of its stroke and the centrifugal force is in the opposite direction, relative to the crank-pin, namely a direction toward the crank-shaft pin, as is the case when the connecting rod reaches the point illustrated in dotted lines in Fig. 1. With our improved construction, a constant supply of oil will be fed to the connecting rod bearings and a sufficient lubrication of the bearings provided regardless of the motor speed as it will be understood that during each passage of the dip-member through the dip-trough of the oil-pan an additional supply of oil is dipped up and trapped by baffle member 17; our device being especially effective at high motor speeds. Our improved means therefore overcomes the serious difficulties encountered with the methods of lubricating at present employed for connecting rod bearings, which methods have been found ineffective, especially at high motor speeds, because of the action of centrifugal force.

It is apparent that with our invention the necessity for drilling the crank-shaft, its webs or arms, as well as the crank-shaft pins and then plugging the outer ends of said passages, to provide ports for the force feed method of oiling, is entirely obviated, while at the same time the disadvantages and objections of that method of oiling are entirely eliminated; it having been found in practice, especially in high speed motors, that the connecting rod bearings very frequently run dry and consequently are soon destroyed.

The construction of Figs. 1 and 2 discloses our improved oiling means formed integral with the connecting rod cap; while the construction in Fig. 3 shows our improved oiling means removably secured to the connecting-rod cap, namely a construction for subsequent application. The improved oiler or dipper in this instance is substantially similar in general construction to that shown in Fig. 1, except that the dipper is made separate from the connecting rod cap or end connection 12, and has its inner end threaded to adapt it to be screwed into a tapped opening in the connecting rod end or cap 12 as shown at 20. The dipper or member 21, shown in Fig. 3, is preferably reduced at its inner threaded end to an extent substantially equal to the usual thickness of the connecting rod cap and bearing metal surrounding the crank-shaft pin, so that the inner end of the dipper or member 21 may come into juxtaposition with the crank-shaft pin and discharge the lubricant thereon. The dipper or member 21, like the dipper or member 14, is provided with baffles 22 and 23 arranged integral with opposite walls and disposed toward the inner end of the member without, however, entirely obstructing the passage through the member 21; the baffle member 22 being arranged at the intake orifice of the dipper member 21. Like in the previously described construction, the oil will be caused to flow lengthwise of the baffle member 22 until it reaches the inner end thereof, when it will flow into the pocket rearward of the baffle member, through the action of centrifugal force, and ultimately thrown or forced onto the bearings; while that portion which has not been taken up by the bearings is prevented from discharging from member 21 by baffle-member 23; a major portion of this unapplied oil discharging into the pocket rearward of the baffle member 23 to be subsequently forced through the inner orifice and onto the crank-shaft pin and connecting rod bearings when the connecting rod reaches a point in its revolution where the action of centrifugal force is toward the crank-shaft pin and therefore from the outer toward the inner end of the dipper member.

In Fig. 4 we illustrate another modified form of our invention, wherein the connecting rod removable end or cap 24 has a depending lug or lip 25 formed integral therewith. The lip is provided with intersecting passages 26 and 27; the passage 26 being disposed in a transverse direction and extending from the forward side of the lip or lug 25, relative to the direction of its movement, and connecting with the upwardly and preferably rearwardly inclined passage 27 at a point slightly above the lower and closed end of passage 27; the passage 27 extending through the connecting rod cap so as to communicate with the crank-shaft pin and connecting rod bearings. With this construction, the lower closed end 28 of the upwardly disposed passage 27 constitutes a pocket wherein the oil will be retained against the action of centrifugal force during certain parts of the stroke or revolution of the connecting rod, until the connecting rod reaches a point or is so disposed relative to the crank-shaft pin where the centrifugal force is in a direction toward the upper and inner end of passage 27, when the oil in the pocket 28 will be caused to flow toward the crank-shaft pin bearing.

In Fig. 5 we show a further modification of our improved means in that the dipper consists of a short tube 29 closed at one end, while the other end is externally threaded to adapt the member to be screwed into a suitably tapped opening in the connecting rod cap. At a slight distance removed from the lower closed end, on what may be called the forward side, member or tube 29 is provided with an opening 30 and this opening has a short tapering member 31 secured therein. This trough member 31 slopes forwardly and downwardly so as to dip into the dip-trough of the oil pan of the motor during rotation of the crank-shaft.

The trough member 31 preferably extends slightly within the member 29 so as to provide a pocket there-beneath as at 32, wherein the oil that has been dipped up by member 31 will be retained. The tubular member 29 is provided with a plurality of truncated cone-shape baffles 33, arranged in partial nested or stacked relation; the apex or small end of each cone-shaped baffle being disposed upwardly and slightly into the base or lower end of the superposed or next adjacent baffle 33. With the base or lower ends of the cones or baffles secured to the inner side walls of the tubular member 29, by welding, soldering or otherwise, pockets are formed intermediate of the cones or baffles 33 and the walls of the member 29. In this construction, the dipped up oil is pocketed by the respective cones or baffles from the lower end 32 toward the upper end during the period of rotation when the connecting rod is disposed above the crank-shaft pin and therefore when the centrifugal force is from the lower end toward the upper end thereof.

In Fig. 6 a substantially similar construction is disclosed so far as the baffle formation is concerned; the tubular member or dipper 34 being formed with a downwardly and forwardly bent end 35 having an open end. The end 35, like the other part of the member 34, is provided with the truncated cone-shaped baffles 36, whose base portions are secured to the sides of the member 34 and thereby provide a series of pockets adapted to trap the oil that has been dipped up by the forwardly presented end 35 while passing through the dip-trough of the oil-pan and retain the same against the action of centrifugal force.

The invention in the various forms shown and described provides means whereby a positive lubrication of the connecting rod bearings at all motor speeds and particularly at high motor speeds, is insured; the different constructions being provided with one or more pockets for receiving the dipped up oil and for retaining the same against centrifugal force toward the intake end of the means, while permitting the oil to flow onto the connecting rod bearings through the action of centrifugal force when the latter is reversed relative to said means.

The exemplifications also make it apparent that our improved means may be made either integral with the connecting rods or removably secured thereto and one or more dippers may be secured to the different connecting rods if desired; furthermore, the specific constructions may be changed in certain details without, however, departing from the spirit of our invention.

What we claim is:

1. Means of the class described, comprising a piston or connecting-rod cap provided with a projection arranged on the opposite side of the crank-pin to extend into the dip-trough or oil-pan of the motor during the lower part of the reciprocating stroke of the rod, the projection being provided with a longitudinal passage extending to the connecting rod bearings about the crank-shaft pin, the lower end of said passage terminating in a forwardly disposed inlet orifice adapted to dip up oil from the dip-trough of the oil-pan, and baffle members, secured to opposite sides within said passage, disposed in a direction lengthwise of the passage to provide oil retaining pockets opening upwardly toward the crank-shaft pin end thereof whereby the oil is held against outflow through the inlet orifice but permitted to flow toward the crank-shaft pin when the action of centrifugal force is in reverse direction.

2. Means of the class described, comprising a tubular member adapted to be secured to the connecting-rod cap to depend therefrom, the upper end of the passage through the member communicating with the connecting rod bearings on the crank-shaft pin, while the lower end of the passage terminates in an inlet orifice disposed in the direction of rotation, a plurality of upwardly disposed baffle members arranged throughout the passage and connected at their lower ends to the inner wall of the tubular member to provide upwardly opening oil retaining pockets.

JOSEPH W. NELSON.
ROBERT S. COULTER.

Witnesses as to Jos. W. Nelson:
G. HEIDEMAN,
VICTOR SOMMERS.
Witnesses as to Robt. S. Coulter:
A. B. STEWART,
J. W. FARLEY.